United States Patent
Rezaiifar

(10) Patent No.: US 8,577,961 B2
(45) Date of Patent: Nov. 5, 2013

(54) METHODS AND APPARATUS FOR OBTAINING CONTENT WITH REDUCED ACCESS TIMES

(75) Inventor: Ramin Rezaiifar, Del Mar, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 262 days.

(21) Appl. No.: 13/010,551

(22) Filed: Jan. 20, 2011

(65) Prior Publication Data

US 2011/0185017 A1 Jul. 28, 2011

Related U.S. Application Data

(60) Provisional application No. 61/299,267, filed on Jan. 28, 2010.

(51) Int. Cl.
*G06F 15/16* (2006.01)
(52) U.S. Cl.
USPC ............................ 709/203; 709/230; 709/232
(58) Field of Classification Search
USPC .......................................... 709/232, 230, 203
See application file for complete search history.

(56) References Cited

U.S. PATENT DOCUMENTS

2011/0093610 A1* 4/2011 Rezaiifar et al. .............. 709/232
2012/0079060 A1 3/2012 Vijayakumar et al.

OTHER PUBLICATIONS

A. Georgakis and H. Li, User Behavior Modeling and Content Based Speculative Web Page Prefetching, Dec. 2006, Data & Knowledge Engineering, vol. 59 Issue 3, pp. 770-788.*
Hui Song and Guohong Cao, Cache-miss-initiated Prefetch in Mobile Environments, Nov. 2004, Department of Computer Science and Engineering, The Pennsylvania State University, Computer Communications 28 (2005), pp. 741-753.*

* cited by examiner

*Primary Examiner* — Andrew Lai
*Assistant Examiner* — Albert Shih
(74) *Attorney, Agent, or Firm* — Neugeboren O'Dowd PC

(57) ABSTRACT

Methods and apparatus for obtaining web content are disclosed. The method includes transmitting, responsive to a user request for a webpage, a primary-content-item-request to obtain a primary content item of the webpage. And a request list that is stored on the client device is accessed to obtain a list of secondary-content-item-requests that are typically needed, in connection with the primary content item, to render the webpage. The secondary-content-item-requests are then transmitted in advance of receiving a response to the primary-content-item-request. And the web page is rendered using the primary content item and the secondary content items.

32 Claims, 6 Drawing Sheets

METHODS AND APPARATUS FOR OBTAINING CONTENT WITH REDUCED ACCESS TIMES

PRIORITY

This application claims priority to U.S. provisional application No. 61/299,267, entitled METHODS AND APPARATUS FOR OBTAINING CONTENT WITH REDUCED ACCESS TIMES filed Jan. 28, 2010, which is incorporated herein by reference in its entirety.

FIELD OF THE INVENTION

The present invention relates to client communication devices. In particular, but not by way of limitation, the present invention relates to communications between a device and a network to obtain web content.

BACKGROUND OF THE INVENTION

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

Still further, users of such device are interested in using the devices to access more web based content. Currently, a device may obtain web content relying on sequential transmission and acknowledgement protocols. In the context of a wired communications network, these protocols have not been found to be overly limiting because the round trip times have been found to be relatively small. But in contrast to a wired communications network, communications through a wireless network may be unfavorably delayed through sequential transmission and acknowledgement protocols which increases the time it takes to access web content.

As a consequence, improved apparatus and methods for obtaining content with access times are desired.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

In accordance with several embodiments, the invention may be characterized as a method of obtaining web content on a client device with reduced access times. The method includes transmitting, from the client device to a remote web server, responsive to a user request for a webpage, a primary-content-item-request to obtain a primary content item of the webpage; accessing a request list that is stored on the client device to obtain a list of secondary-content-item-requests that are typically needed, in connection with the primary content item, to render the webpage; transmitting, from the client device, in advance of receiving a response to the primary-content-item-request from the remote web server, the secondary-content-item-requests for secondary content items; receiving the primary content item and the secondary content items; and rendering the web page using the primary content item and the secondary content items.

In many embodiments, the invention may be characterized as a client device that includes a user interface that enables a user to request a webpage; a web browser that generates a request for a main page of the webpage responsive to the user requesting the webpage; a transmitter that is configured to transmit the request for the main page of the webpage to a remote server; a preemptive request module that requests, before the main page is received, objects that are associated with the main webpage; and a receiver to receive the main page and at least a portion of the objects that are associated with the main page; wherein the web browser renders the webpage using the main page and the objects that are associated with the main page.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In several embodiments of the present invention, a list of resources associated with a previously visited web page is stored, and when a user requests the webpage again, the web browser accesses the list of stored resources so that the web browser may request the resources without having to wait for the main page to be parsed. In this way, resources associated with the web page may be requested while the main web page is being parsed; thus enabling the web page to be rendered in less time.

Figure 1:
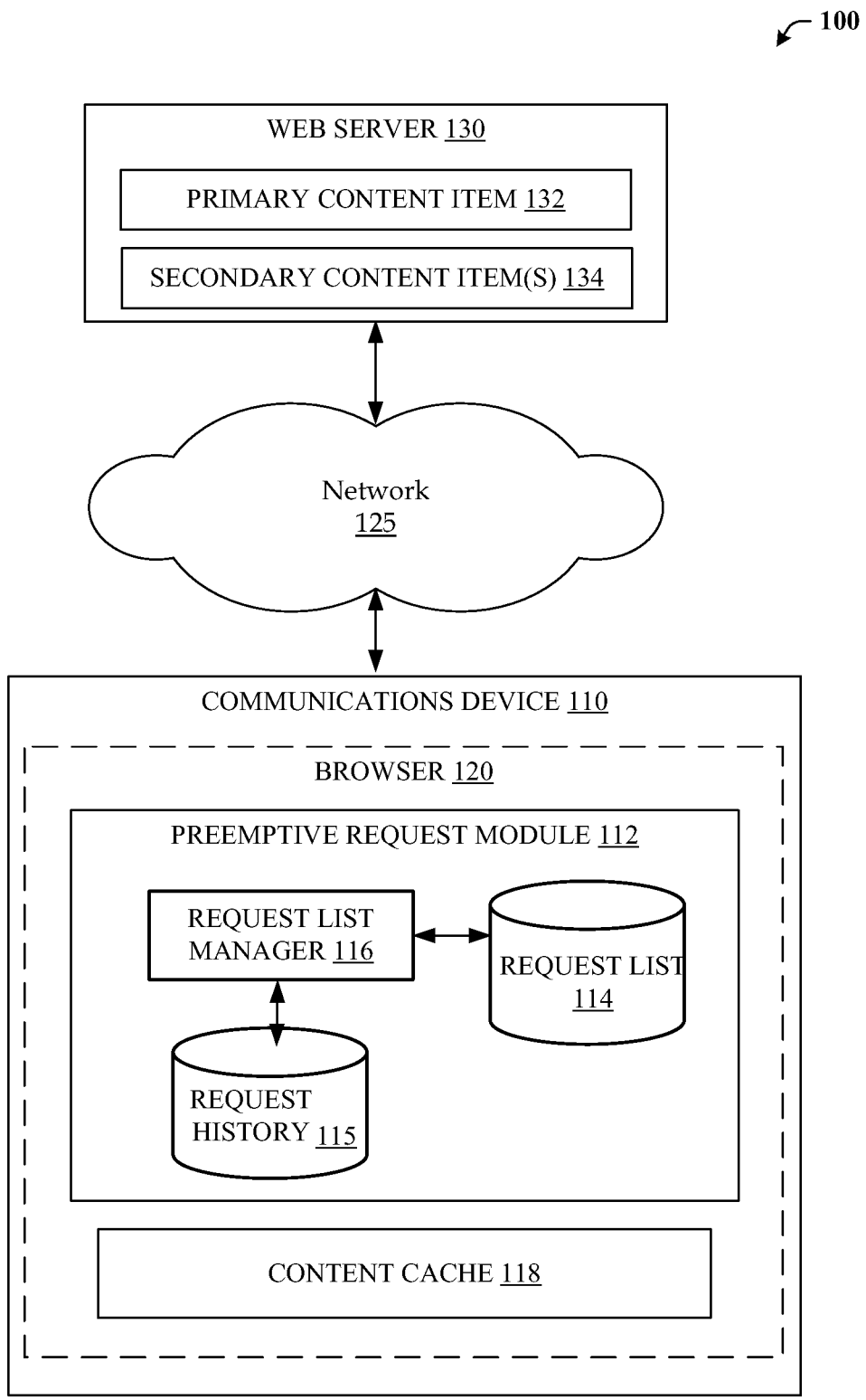
FIG. 1 illustrates a block diagram of a communication network according to several embodiments of the present invention.

Referring first to FIG. 1 for example, shown is a block diagram depicting an exemplary communication network 100 in which many embodiments of the present invention may be implemented. As shown, the communication network 100 includes a web server 130 in communication with a communication device 110 via a network 125. The web server 130 generally operates to serve web content that is requested by the communication device 110 (and potentially many other devices) via the network 125. The network 125 may include the Internet, local area networks, cellular networks (e.g., a CDMA network, a GPRS network, a UMTS networks), and other types of communication networks.

As depicted, the content of a webpage at the web server 130 includes a primary content item 132 and secondary content items 134. As one of ordinary skill in the art will appreciate, the primary content item 132 in many embodiments includes a main page, and the secondary content items 134 include resources (e.g., objects) that are constituent elements of a webpage that are associated with the main page. In many instances for example, the secondary content items 134 may include over one hundred objects including text, images, audio content, animation, video, and other content. And as one of ordinary skill in the art will appreciate, the secondary content items 134 (e.g., objects) are identified by parsing the primary content item 132. In general, the web server 130 is a remote server that serves web content and in variations of the embodiment depicted in FIG. 1, the web server 130 may be realized by a proxy server. And although the secondary content items 134 are depicted on the same web server 130, it should be recognized that the secondary content items 134 may be distributed across several different remote servers.

Generally, the communication device 110 operates as a client device that enables a user to retrieve web content from the web server 130, and the communication device 110 may be realized by client devices including a wireless communications device (WCD) such as a smartphone, PDA, netbook, laptop computer and other wireless devices. But the communication device 110 may work in tandem with wireline and wireless communication devices.

More specifically, the communication device 110 in this embodiment includes a browser 120 that is adapted to include a preemptive request module 112 that enables the secondary content items 134 to be preemptively requested before the primary content item (e.g., main page) 132 is parsed; thus substantially reducing the time it takes to access the secondary content items 134. As shown, the preemptive request module 112 in this embodiment includes a request list manager 116 that is in communication with request history 115 and a request list 114.

In general, the request list manager 116 populates the request list 114 with a listing of secondary content items (e.g., resources) that are associated with each of a plurality of web pages so that, in advance of the primary content item 132 being parsed, and in advance of executing any of the secondary content items 134 that also generate subsequent requests for additional secondary content items, the browser 120 may request (e.g., by way of HTTP GET requests) the secondary content items 134 (including any additional secondary content items) without waiting for the primary content item 132 to be parsed and without waiting for any secondary content items 134 (that generate subsequent requests) to be downloaded. For example, in addition to the requests that are immediately identified when a main page is parsed, other subsequent requests are not identifiable until requested scripts in the main mage are downloaded and executed, and the request list 114 may include both the requests that are immediately identifiable as well as those subsequent requests that would normally not be identifiable until after the main web page is parsed and after request-generating-scripts are requested, downloaded, and executed.

The request history 115 in this embodiment includes a history of requested resources for each of a plurality of web pages, and the request list manager 116 utilizes the request history 115 to populate the request list 114. For example, each time a particular webpage is visited, the request list manager 116 may update the request history 115 so that the request history includes data indicative of the likelihood that the resources will be needed again to render the particular web page. For example, the request history 115 may indicate the percent of time a particular one of the secondary content items 134 has been requested when a particular primary content item 132 has been requested in the past.

Moreover, the request list manager 116 may also populate the request list 114 based upon the type of secondary content items 134 that a web page includes. For example, the request list manager 116 may selectively store certain types or classes of secondary content item requests. For example, request list manager 116 may selectively store requests associated with certain types of objects, such as JavaScript and style sheets which are more likely to remain static across multiple visits to a web site. Additionally, or in the alternative, if an object associated with a request stored in request list 114 is determined to no longer be associated with the primary content item 132, then such a request may be removed from the request set 114.

Additionally, a content cache 118 is also depicted to emphasize that the request list 114 is very different than the content cache 118, which may be a typical cache of content (e.g., images, video, and text) that is available on the client device 100. In contrast, the request list 114 is a list of resources that are likely needed to render a webpage, and the resources may or may not be available on the client device 100.

Figure 2:
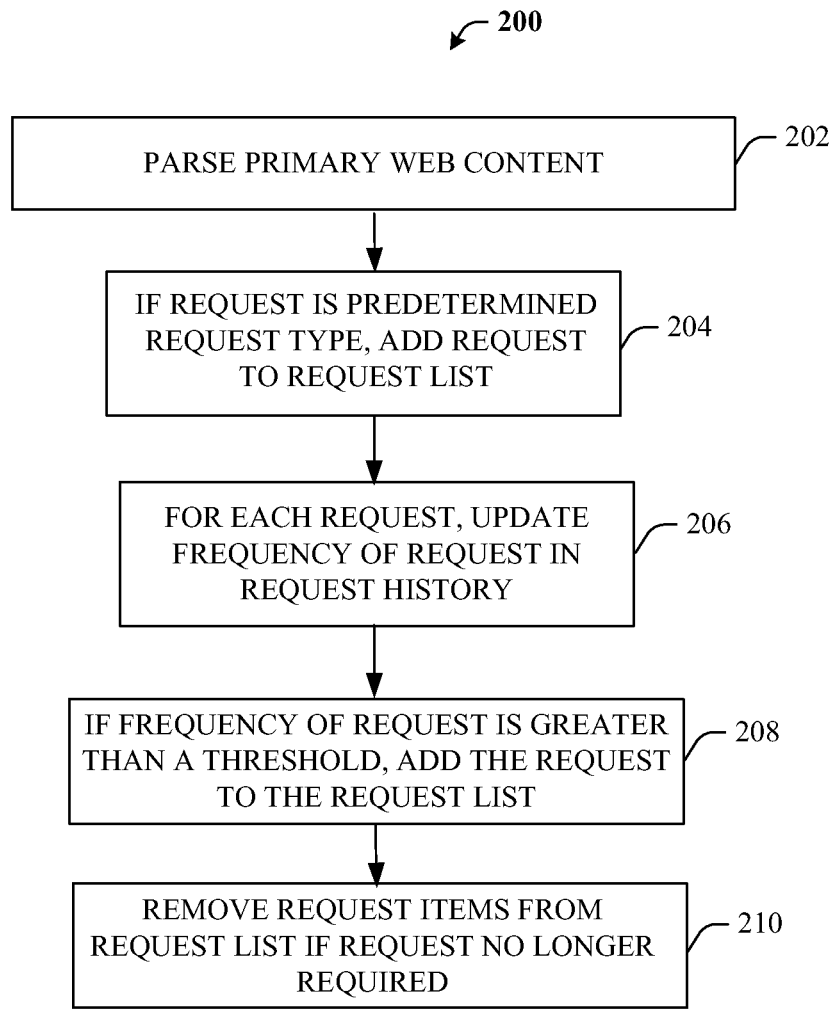
FIG. 2 illustrates a flowchart depicting operations of an aspect depicted in FIG. 1.

While referring to FIG. 1, simultaneous reference is made to FIG. 2, which is a flowchart depicting a method for populating the request list 114 depicted in FIG. 1. More particularly, FIG. 2 depicts a method that is carried out for each primary content item (e.g., for each main page). As shown, when a user of the communication device 110 requests a web page, the primary content item 132 (e.g., main webpage) is retrieved and parsed by the browser 120 (e.g., according to well known parsing techniques)(Block 202). As a consequence of the parsing (Block 202), the secondary content items 134 (e.g., resources) that are necessary to render the web page are identified, and each secondary content item 134 that is a predetermined type of resource is added to the request list 114 in connection with an identifier for the primary content item 132 (Block 204). Although using predetermined types of secondary content items 134 as the basis for adding a secondary content item request to the request list 114 is not required, some resource types, for example scripting-language-type objects (e.g., JavaScript-based objects) and cascading style sheet (CSS) objects, are resource types that are typically requested again and again in connection with a particular web page; thus if one of these resource types is requested even once, the likelihood that the same resource will be required again warrants the addition of the resource to the request list 114.

Many types of secondary content items 134, however, are not prone, by virtue of their function, to be requested again and again, and as a consequence, for these types of requests (e.g., the requests that are not a predetermined request type), the frequency of each secondary content item 134 being requested in connection with a main page is updated in the request history 115 (Block 206). And if a secondary content item 134 is requested with a frequency that exceeds a threshold, the request for the secondary content item 134 is added to the request list 114 (Block 208). For example, for each primary content item 132 (e.g., main page) in the request list 114, a list of requests for secondary content items 134 is maintained on the basis of the frequency by which they were historically requested, and as a consequence, the request list 114 of requested secondary content items 134 is a list of requests that are more likely to be required again in connection with the primary content item 132.

When the request list 114 is empty for example, when a user browses to a particular URL (e.g., CNN.com), the primary content (e.g., main webpage) is retrieved and parsed to obtain a list of secondary content items (e.g., resources) associated with the particular URL, and a list of those secondary content items are stored in the request history 115, and during each subsequent visit to that particular URL (e.g., CNN.com), a site-counter associated with the particular URL is incremented so the number of visits to that particular URL are tracked. And in addition, a content-item-counter for each secondary content item request (e.g., each resource request) is incremented. Thus a promotion-threshold for promoting a secondary content item from the request history 115 to the request list 114 may be normalized by the site-counter (i.e., the number of times the URL has been visited). For example, the promotion-threshold for promoting a particular secondary content item request to the request list 114 may be the percent of time the particular secondary content item request has been has been needed to render the main page. By way of example only, the promotion threshold may be 90 percent, but it should be recognized that the threshold may vary and in some variations, the threshold may be selectable (e.g., by the user).

In terms of the formatting of data in the request history 115 and the request list 114, the request history 115 and request list 114 may include an identifier for each of a plurality of main pages, and for each of those main pages, identifiers (e.g., URLs) for a plurality of resources that are likely necessary to render the main page are stored so that when a user requests a particular main page again, the browser 120 may begin to request the listed resources without waiting for the main page to be parsed.

And as shown in FIG. 2, resources identified in the request list 114 that are unlikely to be required to render a webpage are removed from the request list 114 (Block 210). As discussed above, the steps described with reference to FIG. 2 are executed for each primary content item (e.g., for each main page) so that the resources in the request list 114 may be indexed by the URL of each main page. In some variations, secondary content items are demoted from the request list when the secondary content items are no longer needed (e.g., when the main page no longer includes the secondary content items). It should be recognized that the exemplary modes of operation to promote and demote secondary content items to/from the request list 114 are merely exemplary, and is contemplated that other algorithms may be adopted to enhance the user experience.

Figure 3:
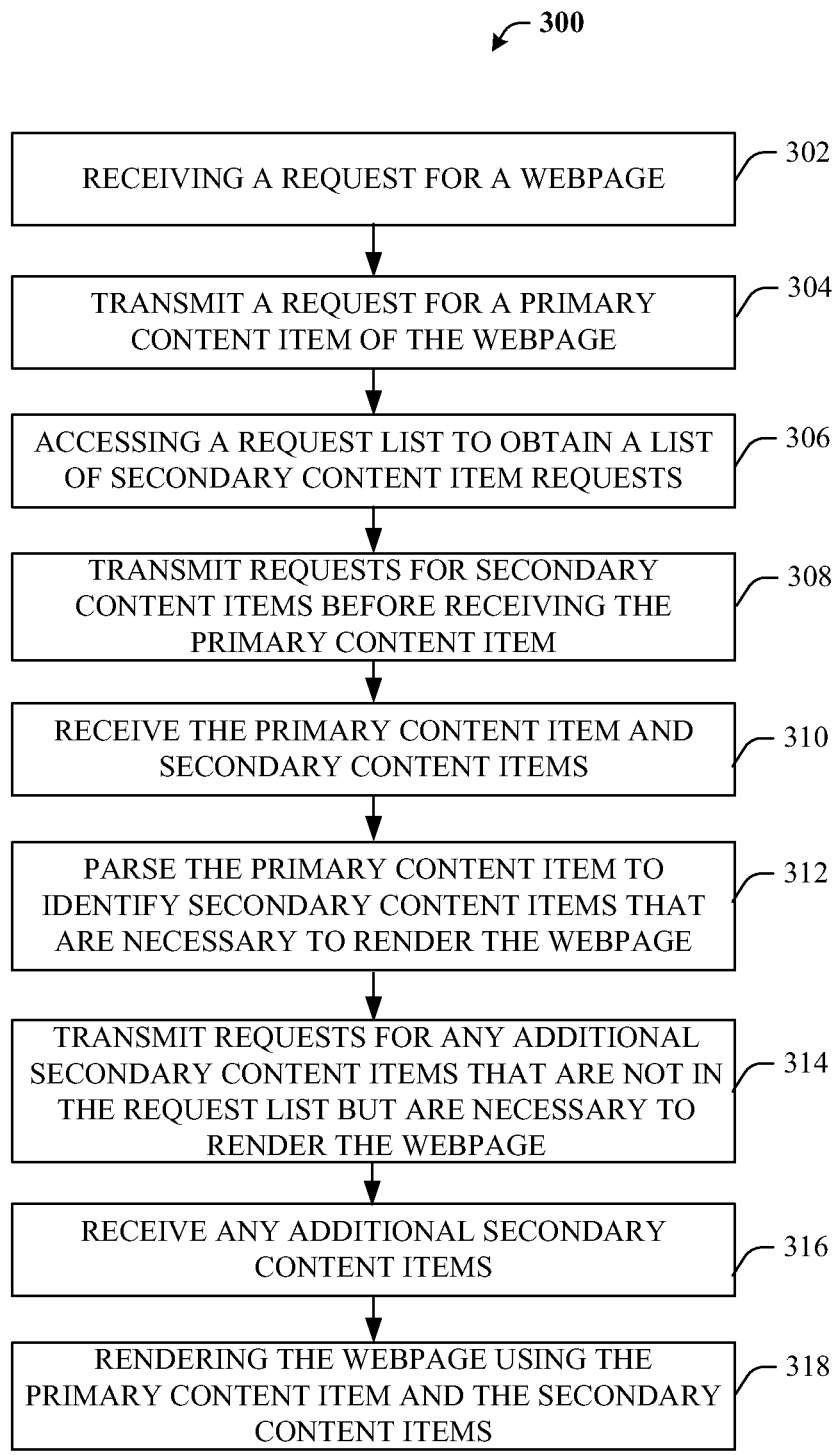
FIG. 3 is a flowchart depicting operations of another aspect depicted in FIG. 1.

Referring next to FIG. 3, it is a flowchart depicting a method for accessing web content using the request list 114. As shown, when a user of the client device 110 requests a webpage (Block 302), the browser 120 in connection with other communication-related components discussed further herein, transmits a request for a primary content item 132 (e.g., a main web page) of the requested webpage (Block 304). And in connection with the request for the primary content item, the request list 114 is accessed to obtain a list of secondary content item requests (e.g., HTTP GETS)(Block 306). As discussed above, the secondary content item requests are requests that are stored in the request list 114 (e.g., in connection with a URL associated with the primary content item) based upon a likelihood that the corresponding secondary content items 134 will be needed to render the requested webpage.

As shown in FIG. 3, the requests for the secondary content items (i.e., the requests in the request list 114) are transmitted before receiving the primary content item 132 (Block 308) so that the typically-experienced time delay associated with waiting for, receiving, and parsing the primary content item to identify required secondary items is avoided.

Figure 4A:
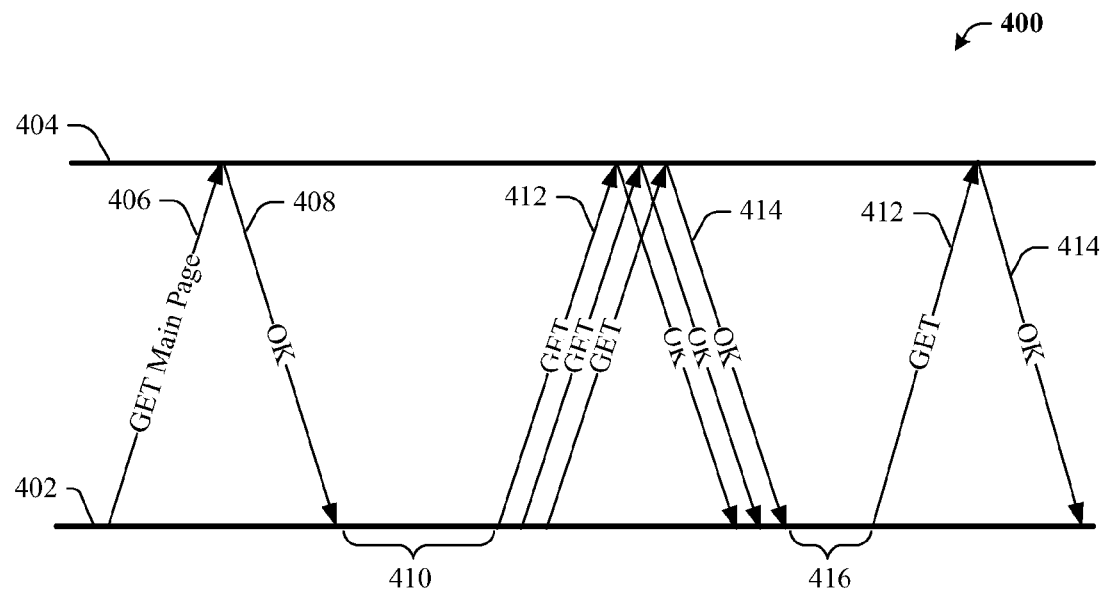
FIG. 4A illustrates a typical content request methodology.
Figure 4B:
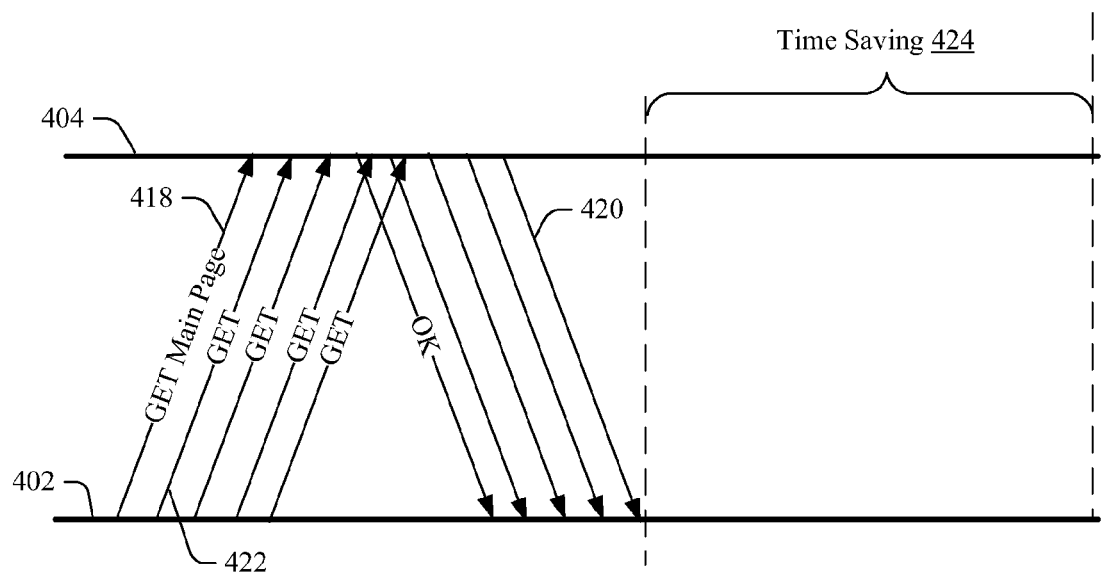
FIG. 4B illustrates another content request methodology used in connection with many embodiments of the present invention.

Referring briefly to FIGS. 4A and 4B, shown in FIG. 4A is a typical sequence of communications, which many embodiments of the present invention avoids, and FIG. 4B is an exemplary sequence of communications that may be carried out in connection with several embodiments of the present invention.

As shown in FIGS. 4A and 4B, the exemplary communication paths are depicted as parallel lines with a transmitting entity 402 and a receiving entity 404. Additionally, communications from the transmitting entity 402 are depicted as a GET message (e.g. 406, 412, 418, 422), and a response from the receiving entity 404 is depicted as an OK message (e.g. 408, 414, 420).

With reference to FIG. 4A, typically each GET message 406, requesting a primary content item, such as a main web page, is coupled to an acknowledgment of receipt (OK) message 408 such that a subsequent GET message may not be sent until the acknowledgement for the prior GET message is received. As shown, upon receipt of the requested main webpage, the transmitting entity may parse 410 the received object to determine associated secondary content items to request, such as JavaScript objects, text, media objects, etc. Once the transmitting entity 402 has determined one or more secondary content items to request, such requests are transmitted 412 and the requested secondary content items may be received 414. Thereafter, transmitting entity 402 may further have to execute code 416 associated with certain secondary content items, which may result in request additional content items. As such, multiple round trips between the transmitting entity 402 and the receiving entity 404 may be used to request primary content items and related secondary content items.

With reference to FIG. 4B, exemplary communications according to several embodiments of the present invention are depicted. As shown, the GET message 418 for a main webpage may be transmitted and related GETs 422 (for resources) may be transmitted prior to receiving a response to the main web page GET. As depicted, through comparison of FIGS. 4A and 4B, time savings 424 may be realized by transmitting requests for the secondary content items associated with the primary content item request prior to receiving a response to the primary content item GET message 418.

Referring again to FIG. 3, once the primary content item and the secondary content items are received (Block 310), the primary content item is parsed to identify secondary content items that are necessary to render the web page (Block 312), and if any additional secondary content items are needed (e.g., that were not requested by virtue of the request list 114 not including requests for the necessary secondary content items), then requests for any additional secondary content items are transmitted (Block 314). And once the additional secondary content items are received (if any were requested) (Block 316), the webpage is rendered using the primary content item and the secondary content items.

Figure 5:
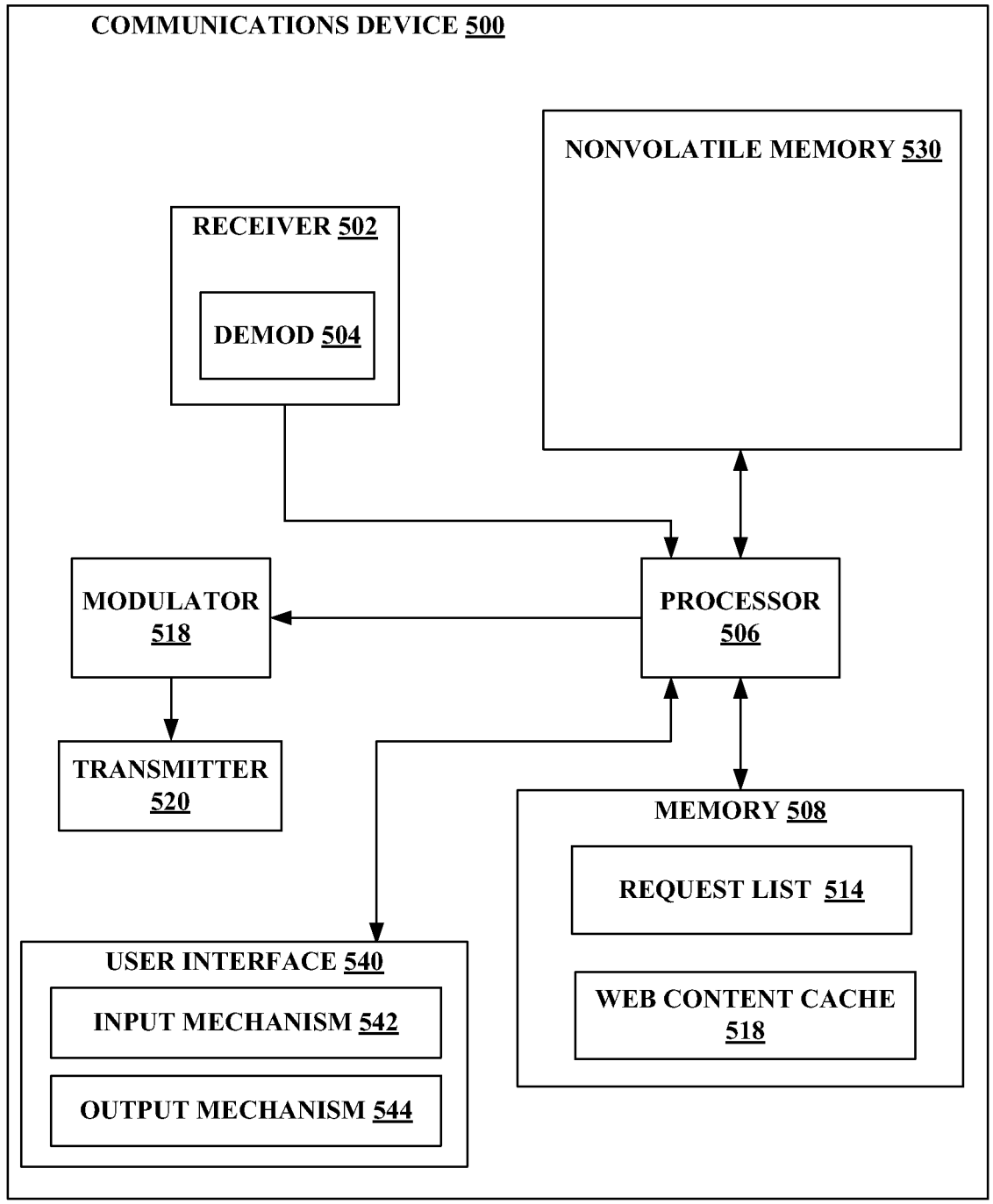
FIG. 5 illustrates a block diagram example architecture of a communications device.

Referring to FIG. 5, it is a block diagram depicting an exemplary architecture of a communication device 500 that may be used to realize the communication device 110 described with reference to FIG. 1. As depicted in FIG. 5, communication device 500 includes a receiver 502 that receives a signal from, for instance, a receive antenna (not shown), and performs typical actions on (e.g., filters, amplifies, downconverts, etc.) the received signal, and digitizes the conditioned signal to obtain samples. Receiver 502 can comprise a demodulator 504 that can demodulate received symbols and provide them to processor 506 for channel estimation. Processor 506 can be a processor dedicated to analyzing information received by receiver 502 and/or generating information for transmission by transmitter 520, a processor that controls one or more components of communication device 500, and/or a processor that both analyzes information received by receiver 502, generates information for transmission by transmitter 520, and controls one or more components of communication device 500.

Communication device 500 also includes memory 508 that is operatively coupled to processor 506 and that can store data to be transmitted, received data, information related to available channels, data associated with analyzed signal and/or interference strength, information related to an assigned channel, power, rate, or the like, and any other suitable information for estimating a channel and communicating via the channel.

As depicted, the memory 508 is utilized to store a request list 514, which may include, for each of a plurality of URLs, a list of requests (HTTP GETS) for secondary content items (e.g., resources) that are likely to be needed to render a webpage associated with each URL. In addition, the memory 508, may be used to store a web content cache 518, such as but not limited to, at least a portion of objects, content, etc., obtained by device 500 during interaction with one or more web content providers. In many modes of operation, a web content cache 518 may be searched to determine if any currently requested secondary content items are already stored on the device 500.

It will be appreciated that the memory 508 may be either volatile memory or nonvolatile memory, or can include both volatile and nonvolatile memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Also shown is a nonvolatile memory 530, which may store processor-executable instructions associated with the pre-emptive request module 112 and the browser 120 described with reference to FIG. 1. And as one of ordinary skill in the art will appreciate, the nonvolatile memory 530 may also include executable instructions associated with an operating system of the communication device 500 and other executable instructions associated with other functions of the communication device 500. By way of illustration, and not limitation, nonvolatile memory can include read only memory (ROM), programmable ROM (PROM), electrically programmable ROM (EPROM), electrically erasable PROM (EEPROM), or flash memory.

Additionally, client device 500 may include a user interface 540. The user interface 540 may include input mechanisms 542 for generating inputs into communication device 500, and output mechanism 544 for generating information for consumption by the user of the communication device 500. For example, input mechanism 542 may include a mechanism such as a key or keyboard, a mouse, a touch-screen display, a microphone, etc. Further, for example, output mechanism 544 may include a display, an audio speaker, a haptic feedback mechanism, a Personal Area Network (PAN) transceiver etc. In the illustrated aspects, the output mechanism 544 may include a display operable to present media content that is in image or video format or an audio speaker to present media content that is in an audio format.

Figure 6:
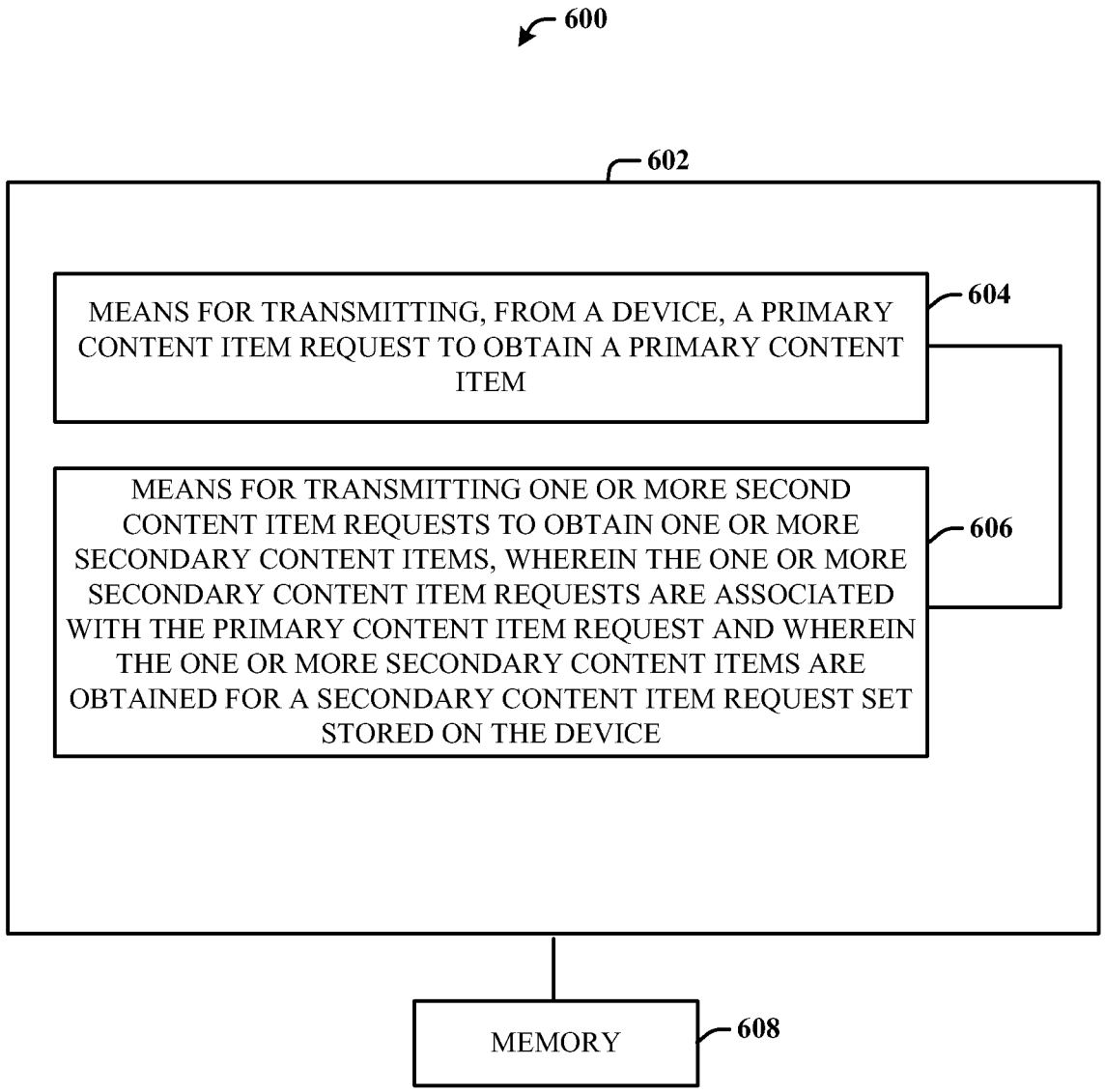
FIG. 6 is a block diagram of an exemplary communication device that can facilitate obtaining content with reduced access times according to an aspect.

With reference to FIG. 6 a block diagram of an exemplary system 600 that can facilitate efficient obtaining of content with reduced access times is illustrated. For example, system 600 can reside at least partially within a wireless device. According to another example aspect, system 600 can reside at least partially within an access terminal. It is to be appreciated that system 600 is represented as including functional blocks, which can be functional blocks that represent functions implemented by a processor, software, or combination thereof (e.g., firmware). System 600 includes a logical grouping 602 of means that can act in conjunction. For instance, logical grouping 602 can include means for transmitting, from a device, a primary content item request to obtain a primary content item 604. Further, logical grouping 602 can comprise means for transmitting one or more second content item requests to obtain one or more secondary content items, wherein the one or more secondary content item requests are associated with the primary content item request and wherein the one or more secondary content items are obtained for a secondary content item request set stored on the device 606. In one aspect, the secondary content item request set may be populated and/or updated through various processes. For example, the secondary content item request list may be populated by storing requests for defined object types. As another example, the secondary content item request list may be added to when one or more object requests from the list once the one or more object requests appear on the list above a threshold number of times.

Additionally, system 600 can include a memory 608 that retains instructions for executing functions associated with the means 604 and 606. While shown as being external to memory 608, it is to be understood that one or more of the means 604 and 606 can exist within memory 608.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 602.11 (Wi-Fi), IEEE 602.16 (WiMAX), IEEE 602.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 602.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of obtaining web content on a client device with reduced access times, the method comprising:
  transmitting from the client device to a remote server, responsive to a user request for a webpage, a primarycontent-item-request to obtain a primary content item of the webpage, the primary content item being stored at the remote server;

accessing, in response to the user request for the webpage, a request list that is stored on the client device to obtain a list of secondary-content-item-requests that are typically needed, in connection with the primary content item, to render the webpage;

transmitting, from the client device, in advance of receiving a response to the primary-content-item-request from the remote web server, but in response to the user request for the webpage, the secondary-content-item-requests for secondary content items;

receiving the primary content item and the secondary content items;

rendering the web page using the primary content item and the secondary content items;

executing at least one of the received secondary content items, the at least one of the received secondary content items generates, when executed, at least one subsequent request for an additional secondary content item; and wherein the request list includes, before execution of the at least one of the received secondary content items, at least one additional secondary-content-item-request that is the same as the at least one subsequent request and the transmitting includes transmitting the at least one additional secondary-content-item-request for the additional secondary content item in advance of the at least one of the received secondary content items being executed.

2. The method of claim 1, wherein the remote server is a remote server selected from the group consisting of a web server and a web proxy server.

3. The method of claim 1, wherein receiving includes receiving some of the secondary content items from one or more remote servers and receiving other secondary content items from a content cache that resides on the client device.

4. The method of claim 1, including:
parsing the primary content item to obtain an actual list of secondary content items that are actually needed, in connection with the primary content item, to render the web page;
updating a request history of previously-requested-secondary-items to reflect a frequency by which each secondary content item that is associated with the primary content item has been requested; and
promoting a particular secondary-content-item-request to the request list if a frequency of the particular secondary-content-item-request, relative to a number of requests for the primary content item, exceeds a promotion threshold.

5. The method of claim 4, including:
demoting a specific one of the secondary-content-item-requests from the request list if a frequency by which the specific one of the secondary-content-item-requests is needed, relative to a number of times the primary content item is requested, falls below a demotion threshold.

6. The method of claim 4, including:
demoting a specific one of the secondary-content-item-requests from the request list if the specific one of the secondary-content-item-requests is not needed to render the web page.

7. The method of claim 4, including:
adding particular types of secondary-content-item-requests to the request list regardless of a frequency that the particular types of secondary-content-item-requests are requested.

8. The method of claim 7, wherein the particular types of secondary-content-item-requests include at least one of a request for JavaScript or a request for style sheets.

9. The method of claim 1, wherein the primary content item is a main page of the webpage and the secondary content items are resources associated with the main page.

10. A client device, the client device comprising:
a user interface that enables a user to request a webpage;
a web browser that generates a request for a main page of the webpage responsive to the user requesting the webpage;
a transmitter, the transmitter is configured to transmit the request for the main page of the webpage to a remote server;
a preemptive request module that requests, before the main page is received, but in response to the user requesting the webpage, objects that are associated with the main webpage, wherein the web browser executes at least one of the received objects, the at least one of the received objects generates, when executed, at least one subsequent request for an additional object, wherein the preemptive request module requests the additional object in advance of the at least one of the received objects being executed; and
a receiver to receive the main page and at least a portion of the objects that are associated with the main page;
wherein the web browser renders the webpage using the main page and the objects that are associated with the main page.

11. The client device of claim 10, wherein the remote server is a remote server selected from the group consisting of a web server and a web proxy server.

12. The client device of claim 10, wherein the web browser is configured to parse the main page and determine whether additional requests for objects are required to render the webpage, and if the additional requests are required, the web browser is configured to generate the additional requests.

13. The client device of claim 10, wherein the preemptive request module is configured to maintain, for each of a plurality of webpages, a request history of requested objects, and the preemptive request module is also configured to generate, based upon the request history, a request list including a list of more frequently requested objects, wherein the objects that are requested before the main webpage is received are objects corresponding to requests obtained from the request list.

14. The client device of claim 10, wherein the web browser is configured to cache at least some of the objects in a memory of the client device so that some of the requested objects are received from the memory of the client device.

15. A client device, the client device comprising:
means for transmitting from the client device to a remote server, responsive to a user request for a webpage, a primary-content-item-request to obtain a primary content item of the webpage, the primary content item being stored at the remote server;
means for accessing, in response to the user request for the webpage, a request list that is stored on the client device to obtain a list of secondary-content-item-requests that are typically needed, in connection with the primary content item, to render the webpage;
means for transmitting, from the client device, in advance of receiving a response to the primary-content-item-request from the remote web server, but in response to the user request for the webpage, the secondary-content-item-requests for secondary content items;
means for receiving the primary content item and the secondary content items;

means for rendering the web page using the primary content item and the secondary content items;
means for executing at least one of the received secondary content items, the at least one of the received secondary content items generates, when executed, at least one subsequent request for an additional secondary content item; and
wherein the request list includes, before execution of the at least one of the received secondary content items, at least one additional secondary-content-item-request that is the same as the at least one subsequent request and the means for transmitting includes means for transmitting the at least one additional secondary-content-item-request for the additional secondary content item in advance of the at least one of the received secondary content items being executed.

16. The client device of claim 15, wherein the remote server is a remote server selected from the group consisting of a web server and a web proxy server.

17. The client device of claim 15, wherein means for receiving includes means for receiving some of the secondary content items from one or more remote servers and means for receiving other secondary content items from a content cache that resides on the client device.

18. The client device of claim 15, including:
means for parsing the primary content item to obtain an actual list of secondary content items that are actually needed, in connection with the primary content item, to render the web page;
means for updating a request history of previously-requested-secondary-items to reflect a frequency by which each secondary content item that is associated with the primary content item has been requested; and
means for promoting a particular secondary-content-item-request to the request list if a frequency of the particular secondary-content-item-request, relative to a number of requests for the primary content item, exceeds a promotion threshold.

19. The client device of claim 18, including:
means for demoting a specific one of the secondary-content-item-requests from the request list if a frequency by which the specific one of the secondary-content-item-requests is needed, relative to a number of times the primary content item is requested, falls below a demotion-threshold.

20. The client device of claim 18, including:
means for demoting a specific one of the secondary-content-item-requests from the request list if the specific one of the secondary-content-item-requests is not needed to render the web page.

21. The client device of claim 18, including:
means for adding particular types of secondary-content-item-requests to the request list regardless of a frequency that the particular types of secondary-content-item-requests are requested.

22. The client device of claim 21, wherein the particular types of secondary-content-item-requests include at least one of a request for JavaScript or a request for style sheets.

23. The client device of claim 15, wherein the primary content item is a main page of the webpage and the secondary content items are resources associated with the main page.

24. A non-transitory, tangible computer readable storage medium, encoded with processor readable instructions to perform a method for obtaining web content on a client device, the method comprising:
transmitting from the client device to a remote web server, responsive to a user request for a webpage, a primary-content-item-request to obtain a primary content item of the webpage, the primary content item being stored at the remote web server;
accessing, in response to the user request for the webpage, a request list that is stored on the client device to obtain a list of secondary-content-item-requests that are typically needed, in connection with the primary content item, to render the webpage;
transmitting, from the client device, in advance of receiving a response to the primary-content-item-request from the remote web server, but in response to the user request for the webpage, the secondary-content-item-requests for secondary content items;
receiving the primary content item and the secondary content items;
rendering the web page using the primary content item and the secondary content items;
executing at least one of the received secondary content items, the at least one of the received secondary content items generates, when executed, at least one subsequent request for an additional secondary content item; and
wherein the request list includes, before execution of the at least one of the received secondary content items, at least one additional secondary-content-item-request that is the same as the at least one subsequent request and the transmitting includes transmitting the at least one additional secondary-content-item-request for the additional secondary content item in advance of the at least one of the received secondary content items being executed.

25. The non-transitory, tangible computer readable storage medium of claim 24, wherein the remote server is a remote server selected from the group consisting of a web server and a web proxy server.

26. The non-transitory, tangible computer readable storage medium of claim 24, wherein receiving includes receiving some of the secondary content items from one or more remote servers and receiving other secondary content items from a content cache that resides on the client device.

27. The non-transitory, tangible computer readable storage medium of claim 24, the method including:
parsing the primary content item to obtain an actual list of secondary content items that are actually needed, in connection with the primary content item, to render the web page;
updating a request history of previously-requested-secondary-items to reflect a frequency by which each secondary content item that is associated with the primary content item has been requested; and
promoting a particular secondary-content-item-request to the request list if a frequency of the particular secondary-content-item-request, relative to a number of requests for the primary content item, exceeds a promotion threshold.

28. The non-transitory, tangible computer readable storage medium of claim 27, the method including:
demoting a specific one of the secondary-content-item-requests from the request list if a frequency by which the specific one of the secondary-content-item-requests is needed, relative to a number of times the primary content item is requested, falls below a demotion threshold.

29. The non-transitory, tangible computer readable storage medium of claim 27, the method including:
demoting a specific one of the secondary-content-item-requests from the request list if the specific one of the secondary-content-item-requests is not needed to render the web page.

30. The non-transitory, tangible computer readable storage medium of claim 27, the method including:
    adding particular types of secondary-content-item-requests to the request list regardless of a frequency that the particular types of secondary-content-item-requests are requested.

31. The non-transitory, tangible computer readable storage medium of claim 30, wherein the particular types of secondary-content-item-requests include at least one of a request for JavaScript or a request for style sheets.

32. The non-transitory, tangible computer readable storage medium of claim 24, wherein the primary content item is a main page of the webpage and the secondary content items are resources associated with the main page.

* * * * *